United States Patent [19]
Garces et al.

[11] Patent Number: 5,552,980
[45] Date of Patent: Sep. 3, 1996

[54] INVERTER CONTROL DEVICE

[75] Inventors: Luis Garces, Le Pecq; Vinh T. N'Guyen Phuoc, Boulogne sur Seine, both of France

[73] Assignee: Schneider Electric SA, Boulogne-Billancourt, France

[21] Appl. No.: 396,796

[22] Filed: Mar. 1, 1995

[30] Foreign Application Priority Data

Mar. 1, 1994 [FR] France ................... 94 02428

[51] Int. Cl.⁶ .................. H02M 3/24; H02M 7/5387
[52] U.S. Cl. .................................. 363/98; 363/132
[58] Field of Search ................ 363/17, 98, 132, 363/37, 40, 41; 318/727, 807, 809, 811

[56] References Cited

U.S. PATENT DOCUMENTS

| | | | |
|---|---|---|---|
| 5,214,575 | 5/1993 | Sugishima et al. | 363/98 |
| 5,367,240 | 11/1994 | Schroder-Brumloop | 318/727 |
| 5,373,195 | 12/1994 | De Doncker et al. | 363/98 |
| 5,373,436 | 12/1994 | Yamaguchi et al. | 363/98 |

FOREIGN PATENT DOCUMENTS

| | | |
|---|---|---|
| 63-148894 | 6/1988 | Japan. |
| 1-136572 | 5/1989 | Japan. |

OTHER PUBLICATIONS

"Slope Modulation in Inverter Circuits" in *Conference Record of the 1989 IEEE Industry Applications Society Annual Meeting, Part I.* Papers Presented at the 1989 Industry Applications Conference; Twenty–Fourt IAS Annual Meeting, Hotel del Coronado, San Diego, California; Oct. 1–5, 1989. By John C. Salmon and Daniel Hagan. pp. 760–766. IEEE Catalog No. 89CH2792–0.

*Primary Examiner*—Matthew V. Nguyen
*Attorney, Agent, or Firm*—Oblon, Spivak, McClelland, Maier & Neustadt, P.C.

[57] ABSTRACT

A control device for a multi-phase inverter is connected to a power supply source through a DC circuit and controlled in pulse width modulation by a control circuit (20), including several pairs of static switches installed in parallel with free wheel diodes, the mid-point of each pair being connected to a load; switching is done by comparison in said control circuit between an input signal defined by control voltages that are a function of simple voltage set values and a triangular carrier wave output by a triangular wave generator. The device uses a constant switching frequency and a parameter other than the frequency of the carrier wave, the value of which varies in a random manner in order to obtain after switching the simple voltage set values between the phases and the neutral of the load.

7 Claims, 2 Drawing Sheets

5,552,980

INVERTER CONTROL DEVICE

BACKGROUND OF THE INVENTION

1. Field of the Invention

This present invention concerns a control device for a multiphase inverter connected to a power supply source through a DC circuit and controlled in pulse width modulation through a control circuit, including a bridge consisting of several pairs of static switches placed in parallel with free wheel diodes, the mid-point of each pair being connected to a load; switching is done by comparison of an input signal and a triangular carrier wave in the control circuit.

2. Description on the Prior Art

The purpose of an inverter is to generate a power supply, for example a three-phase supply with variable voltage and frequency starting from a dc source. The inverter switches the DC source and outputs voltages that contain fundamental components with phase shifts so as to form a balanced three phase power supply that can be used to power a load, for example a motor.

The switching system usually used, that will be defined as a standard switching, uses a fixed switching frequency. It consists of choosing a switching period to define switching times for pairs of switches on the inverter bridge, by comparing an input signal and a carrier wave, the frequency of which is equal to the switching frequency.

However this switching generates noise, which results in the appearance of frequency bands at multiples of the switching frequency.

Thus a high switching frequency considered to be beyond the range of audible frequencies, will create high switching losses.

At low switching frequency within the range of audible frequencies, this noise may simply be annoying to the human ear.

One known method of reducing noise is to spread the frequency bands that appear at multiples of the switching frequency, within the spectral range.

This is usually done by using a system with a random switching frequency. The frequency is determined at random within a given frequency range. If the shape of the carrier wave is triangular, this system with a random switching frequency can create triangles with a variable period. This system is suitable for medium switching frequencies.

On the other hand at low frequencies, it is difficult to apply this system with random switching frequency. The frequency band is narrow and therefore the number of frequencies to be drawn at random is small.

SUMMARY OF THE INVENTION

Therefore, the proposed invention consists of an inverter control device capable of reducing noise generated by switching, particularly at low frequency. The device uses a constant switching frequency and a parameter other than carrier wave frequency, chosen at random so that after switching the simple voltage set values to be imposed on a load are obtained between the phases and the neutral on this load.

According to one embodiment, the slopes of the sides of each triangle in the triangular carrier wave are asymmetrical and chosen so that each triangle is inscribed within the constant switching period T of the inverter.

According to one feature of the invention, the control circuit input signal is equal to the simple voltage set values.

According to another embodiment, the slopes of the triangles in the carrier wave are symmetrical, and the voltage measured between the neutral of the load and a point in the DC circuit varies at random. Thus the input signal to the control circuit is equal to the simple voltage set values, plus a randomly variable value $V_{NO}$ chosen such that each input signal voltage is less than half the voltage in the DC circuit.

The description below with reference to the drawings shows the characteristics and advantages of the invention.

DETAILED DESCRIPTION OF THE PREFERRED EMBODIMENTS

Figure 1:
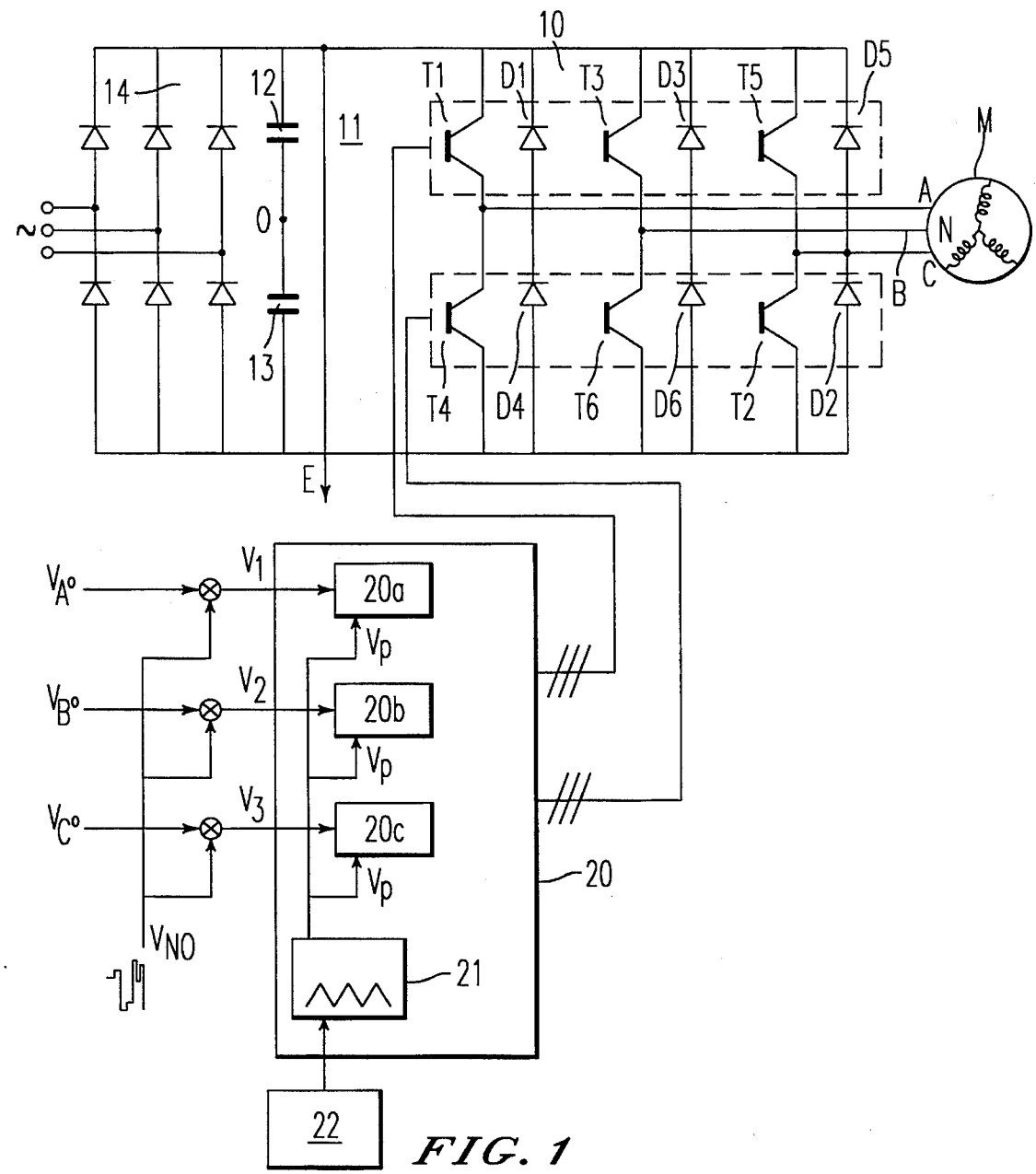
FIG. 1 shows a schema of the inverter according to the invention.

The inverter according to the invention, mark 10, is connected through DC circuit 11 equipped with two capacitors 12 and 13, to a rectifier bridge 14 connected to the phase conductors of a 3-phase network. The output of the inverter is connected to phase conductors A, B and C of a load such as, for example, an asynchronous motor M.

The inverter includes six controlled static switches composed of three pairs of semiconductor switches T1, T6 in parallel, containing free wheel diodes D1, D6. Each pair of switches includes two transistors in cascade (T1,T4; T3,T6; T5, T2) one of which (T1, T3, T5) is said to be the high channel, and the other (T4, T6, T2) is said to be the low channel. The mid-point of each pair is connected to a phase winding of the motor. A control circuit 20 makes switches T1 to T6 conducting and blocking at chosen times.

For example, control circuit 20 may be an ASIC type component. It comprises a triangular wave $V_p$ generator 21 and comparators 20a, 20b, 20c into which the carrier wave $V_p$ and input voltages $V_1$, $V_2$ and $V_3$ are input. The values of voltages $V_1$, $V_2$ and $V_3$, and the shape of the triangular carrier wave are chosen as a function of the embodiment used to reduce the noise.

The first embodiment of the invention uses a carrier wave generator with random slopes for a fixed switching frequency T.

A memory 22 stores tables of triangular slopes available as a function of the fixed switching frequency used and the value of the voltage E of the chosen DC circuit.

A random draw of the slope $\alpha_1$ of one of the sides of each triangle is made by software means, and is signalled to the wave generator 21.

Figure 2A:
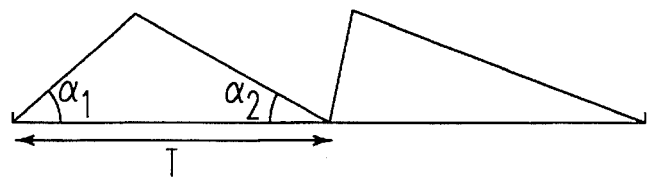
FIGS. 2a and 2b show the shapes of the carrier wave according to the chosen embodiment, for two sampling periods.

The generator 21 creates the carrier wave by choosing the slope $\alpha_2$ of the other side of the triangles such that each triangle is inscribed in the constant switching period T of the inverter. Therefore the carrier wave $V_p$ contains a single triangle for each switching period, and the slopes of each triangle are asymmetric (FIG. 2a).

The switching principle remains unchanged, comparators 20a, 20b, 20c compare each imposed input voltage $V_1$, $V_2$ and $V_3$ with the carrier wave $V_p$, circuit 20 then controls the switches as a function of the result of the comparison.

Figure 3:
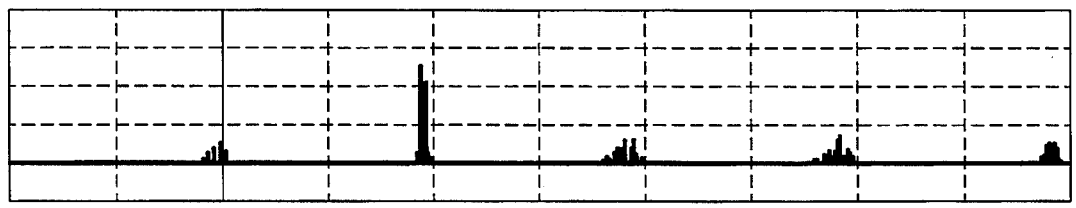
FIG. 3 shows the composite voltage spectrum between two phases of a motor for standard switching at 3.92 kHz.

FIG. 3 shows an example of the spectrum obtained by standard switching. The frequency is fixed (3.92 kHz), slopes of the carrier wave triangles are symmetrical, and the control voltages $V_1$, $V_2$ and $V_3$ imposed at the input to the control circuit are equal to the simple voltage set values $V_{A*}$, $V_{B*}$, $V_{C*}$, that are required on the motor between phases and the neutral.

Figure 4:
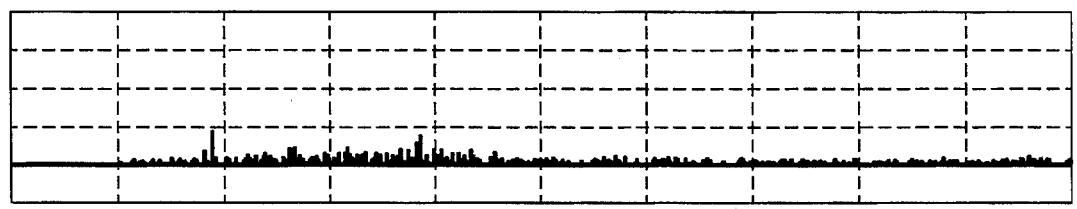
FIG. 4 shows the composite voltage spectrum between two motor phases at a fixed frequency of 3.92 kHz, according to a first embodiment.

FIG. 4 shows how the first embodiment is used for the same switching frequency of 3.92 kHz and the same control voltages $V_1$, $V_2$ and $V_3$. The spectrum obtained gives a good spread compared with that obtained with standard switching in FIG. 3.

The second embodiment of the invention uses random offset of the motor neutral with respect to the mid-point O of the DC circuit with a fixed switching frequency.

Figure 2B:
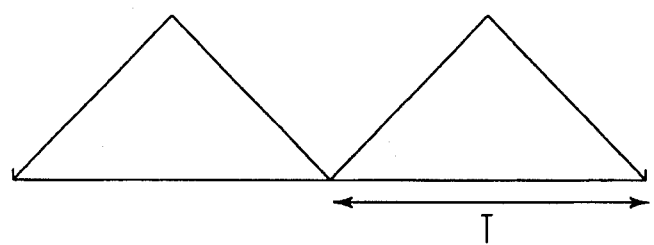
Figure 6:
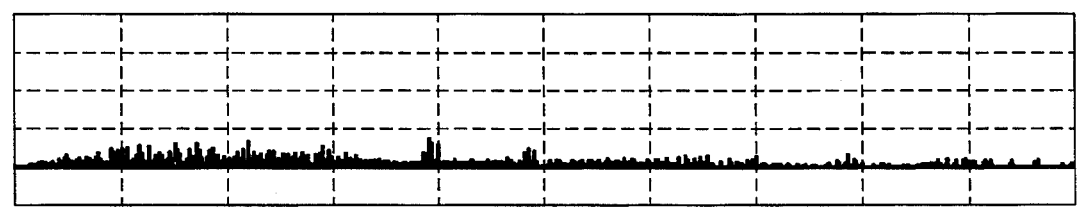
FIG. 6 shows the composite voltage spectrum between two motor phases for a second embodiment at a fixed frequency of 1.96 kHz.

This mode is illustrated at low frequency in FIG. 6. Switching and current measurement constraints require that the triangle remains symmetrical. This is why this embodiment consists of shifting the voltage taken between the motor neutral and the mid-point O of the DC circuit and equal to E, keeping the fixed switching frequency and slopes of symmetrical triangles as shown in FIG. 2b.

This shift consists of adding the same value $V_{NO}$ to the three simple voltage set values $V_{A*}$, $V_{B*}$, $V_{C*}$, once or twice per period, to obtain input values $V_1$, $V_2$, $V_3$ to the control circuit 20.

This shift is only possible if each imposed voltage $V_1$, $V_2$ and $V_3$ is less than E/2, otherwise there is a risk of going outside the range in which the inverter is linear.

Figure 5:
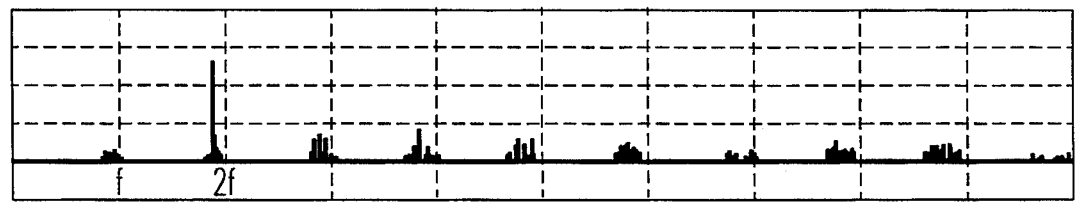
FIG. 5 shows the composite voltage spectrum between two motor phases for standard switching at 1.96 kHz.

FIG. 5 illustrates a spectrum obtained by standard switching. The wave frequency is fixed (f=1.96 kHz), each triangle remains symmetrical and voltages $V_1$, $V_2$ and $V_3$ are equal to the simple voltage set values $V_{A*}$, $V_{B*}$, $V_{C*}$. A double frequency band can be seen (2f).

FIG. 6 shows a spectrum according to a second embodiment for a switching frequency of 1.96 kHz. This figure shows that the spectrum is well spread, and particularly that there are no bands at double the frequency, compared with the standard switching in FIG. 5.

There is claimed:

1. A control device for a multi-phase inverter connected to a power supply source through a DC circuit and pulse width modulated by a control circuit, said inverter including a plurality of pairs of static switches in parallel with a respective plurality of pairs of free wheel diodes wherein a mid-point of each of said pair of switches and said pair of diodes is connected to a load, said control device comprising:

a switching device including comparator means for comparing an input signal and a triangular carrier wave output by a triangular wave generator, wherein said input signal is defined by control voltages which are a function of simple voltage set values and wherein said control device operates at a constant switching frequency and provides a parameter other than the frequency of said carrier wave wherein the value of said parameter varies in a random manner in order to provide, after operation of said switching device, said simple voltage set values between phases and a neutral of said load.

2. Device according to claim 1, wherein the slopes of the sides of each triangle of said triangular carrier wave are asymmetric.

3. Device according to claim 2, wherein one of the slopes of said triangle is chosen at random, and the other slope is chosen such that the triangle is inscribed within the constant switching period (T) of the inverter.

4. Device according to claim 1, wherein said control circuit input voltages are equal to said simple voltage set values.

5. Device according to claim 1, wherein the slopes of said carrier wave triangles are symmetrical and the voltage taken between the neutral of the load and a point on the DC circuit varies at random.

6. Device according to claim 1, wherein said control circuit input voltages are equal to said simple voltage set values, plus a random varying value.

7. Device according to claim 6, wherein said random varying value is chosen such that each control circuit input voltage is less than E/ 2, where E is the voltage in the DC circuit.

* * * * *